(12) United States Patent
Inoue (10) Patent No.: US 10,507,869 B2
(45) Date of Patent: Dec. 17, 2019

(54) VEHICLE BODY STRUCTURE

(71) Applicant: TOYOTA JIDOSHA KABUSHIKI KAISHA, Toyota-shi, Aichi-ken (JP)

(72) Inventor: Shin Inoue, Okazaki (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 31 days.

(21) Appl. No.: 16/028,809

(22) Filed: Jul. 6, 2018

(65) Prior Publication Data
US 2019/0016391 A1   Jan. 17, 2019

(30) Foreign Application Priority Data
Jul. 14, 2017   (JP) ................. 2017-138414

(51) Int. Cl.
*B62D 21/15*   (2006.01)
*B60K 1/04*   (2019.01)
*B62D 21/03*   (2006.01)

(52) U.S. Cl.
CPC .............. *B62D 21/155* (2013.01); *B60K 1/04* (2013.01); *B62D 21/03* (2013.01); *B60K 2001/0438* (2013.01)

(58) Field of Classification Search
CPC ........ B62D 43/10; B62D 21/11; B62D 25/20; B62D 21/00; B62D 21/155; B60Y 2306/01; B60K 2001/0433; B60K 1/00

USPC ..................................................... 296/187.11
See application file for complete search history.

(56) References Cited

U.S. PATENT DOCUMENTS

| | | | |
|---|---|---|---|
| 8,795,873 B2 * | 8/2014 | Ahn | H01M 2/1055 429/100 |
| 9,623,911 B2 * | 4/2017 | Kano | B62D 21/11 |
| 2008/0283317 A1 * | 11/2008 | Wagner | B60R 16/04 180/68.5 |
| 2012/0097466 A1 | 4/2012 | Usami et al. | |
| 2017/0200931 A1 * | 7/2017 | DeKeuster | H01M 2/1077 |

FOREIGN PATENT DOCUMENTS

| | | |
|---|---|---|
| FR | 3018762 A1 * | 9/2015 |
| JP | H09-272459 A | 10/1997 |
| JP | 2012-91635 A | 5/2012 |
| WO | WO-2015144289 A1 * | 10/2015 |

* cited by examiner

*Primary Examiner* — Pinel E Romain
(74) *Attorney, Agent, or Firm* — Oliff PLC (57) ABSTRACT

A vehicle body structure includes a load transmission member, a first engagement portion, and a second engagement portion. The load transmission member is disposed at a position overlapping with the power unit in a vehicle front view. The first engagement portion is provided between the load transmission member and the power unit. The second engagement portion is provided between the suspension member and the power unit.

9 Claims, 7 Drawing Sheets

VEHICLE BODY STRUCTURE

CROSS-REFERENCE TO RELATED APPLICATION

This application is based on and claims priority under 35 USC 119 from Japanese Patent Application No. 2017-138414 filed on Jul. 14, 2017, the disclosure of which is incorporated by reference herein.

BACKGROUND

Technical Field

The present disclosure relates to a vehicle body structure.

Related Art

Japanese Patent Application Laid-Open (JP-A) No. 2012-91635 discloses a battery mounting structure for an electric vehicle. In this vehicle, a battery unit is provided at a vehicle lower side of the cabin. Each vehicle width direction end of the battery unit is connected to a vehicle body member, and a vehicle front-side end of the battery unit is fixed to a front suspension member. The battery unit is thus used to increase the torsional rigidity of the vehicle body.

In recent years there has been demand for electric vehicles with increased range, and to meet this demand it is necessary to increase the size of battery units. So as to limit any influence on the vehicle cabin when increasing the size of the battery unit, it is conceivable to enlarge the battery unit along the vehicle front-rear direction. However, since the distance between the power unit and the battery unit is reduced when the battery unit is enlarged along the vehicle front-rear direction, there is a risk that the power unit will be displaced by collision load in a vehicle collision such that the power unit makes contact with and causes damage to the battery unit. To avoid this, it is conceivable to increase the flexural rigidity of a side member, this being part of the vehicle body frame, so as to suppress displacement of the power unit. However, since it is necessary to increase the plate thickness of the side member to increase the flexural rigidity of the side member, for example, there is a chance that the weight of the vehicle will be increased. There is thus room for improvement regarding this point in the electric vehicle battery mounting structure disclosed by JP-A 2012-91635.

SUMMARY

An object of the present disclosure is to provide a vehicle body structure capable of suppressing damage to a battery unit in a vehicle collision while also suppressing an increase in vehicle weight.

A vehicle body structure according to a first aspect includes a suspension member, a power unit, a battery unit, a load transmission member, a first engagement portion, and a second engagement portion. The suspension member is attached to a left and right pair of side members provided extending along a vehicle front-rear direction. The power unit is attached to the suspension member. The battery unit is disposed at a position overlapping with the power unit in a vehicle front view, and is provided spaced apart from the power unit at an inner side in the vehicle front-rear direction with respect to the power unit. The load transmission member is disposed at a position overlapping with the power unit in a vehicle front view, and is provided spaced apart from the power unit at an outer side in the vehicle front-rear direction with respect to the power unit. The first engagement portion is provided between the load transmission member and the power unit, and is configured to transmit collision load to the power unit when input with collision load from the load transmission member substantially toward the vehicle front-rear direction inner side. The second engagement portion is provided between the suspension member and the power unit, and is configured to transmit collision load to the suspension member when input with collision load from the power unit substantially toward the vehicle front-rear direction inner side.

In the first aspect, the power unit is attached to the suspension member, which is attached to the left and right pair of side members provided extending along the vehicle front-rear direction. The battery unit is disposed at a position overlapping with the power unit in a vehicle front view, and is provided spaced apart from the power unit at an inner side in the vehicle front-rear direction with respect to the power unit. The load transmission member is provided at a position overlapping with the power unit in a vehicle front view, and is provided spaced apart from the power unit at an outer side in the vehicle front-rear direction with respect to the power unit. The first engagement portion is provided between the load transmission member and the power unit, and is configured to transmit collision load to the power unit when input with collision load from the load transmission member substantially toward the vehicle front-rear direction inner side. Furthermore, the second engagement portion is provided between the suspension member and the power unit, and is configured to transmit collision load to the suspension member when input collision load from the power unit substantially toward the vehicle front-rear direction inner side. Accordingly, although the power unit is displaced toward the battery unit due to receiving collision load from the load transmission member through the first engagement portion when collision load is input toward the vehicle front-rear direction inner side in a vehicle collision, since collision load is transmitted from the power unit to the suspension member by the second engagement portion, it is possible to suppress displacement of the power unit toward the battery unit. Since interference between the power unit and the battery unit in a vehicle collision can be suppressed, it is thus possible to suppress damage to the battery unit.

The power unit is generally a rigid body, which enables collision load toward the vehicle front-rear direction inner side to be transmitted from the load transmission member through the power unit to the suspension member attached to the side members in a vehicle collision. Namely, in addition to through the left and right pair of side members, which are part of the vehicle frame, it possible to use the power unit to provide another route (load path) through which load can be transmitted, thus enabling collision load to be efficiently transmitted to the vehicle body. This obviates the need to raise the rigidity of the side members, in contrast to cases in which load paths are only configured through the side members.

A vehicle body structure according to a second aspect, in the first aspect, wherein the first engagement portion and the second engagement portion are normally disposed spaced apart from the power unit.

In the second aspect, the first engagement portion and the second engagement portion are normally disposed spaced apart from the power unit. Thus, vibration and the like resulting from normal operation of the power unit can be suppressed from being transmitted to the load transmission member, the suspension member, and the like, through the first engagement portion and the second engagement portion. Note that "normal" refers to a state before a vehicle collision.

A vehicle body structure according to a third aspect, in the first aspect, wherein the load transmission member is provided extending outward substantially in the vehicle front-rear direction from a floor cross-member, the floor cross-member coupling the left and right pair of side members together substantially in a vehicle width direction and facing the power unit. Further, the first engagement portion is provided at a position at which the floor cross-member and the power unit face each other.

In the third aspect, the load transmission member is provided extending outward substantially in the vehicle front-rear direction from the floor cross-member, coupling the left and right pair of side members together substantially in the vehicle width direction and facing the power unit, and the first engagement portion is provided at a position where the floor cross-member and the power unit face each other. Thus, in cases in which collision load is input toward the vehicle front-rear direction inner side in a vehicle collision, collision load is able to be transmitted from the floor cross-member to the side members when the collision load is transmitted to the suspension member from the load transmission member through the floor cross-member, the first engagement portion, and the power unit. Namely, providing an additional load path enables collision load to be more efficiently transmitted to the vehicle body.

A vehicle body structure at a fourth aspect, in the third aspect, wherein a bumper reinforcement that extends substantially along the vehicle width direction is provided at a vehicle front-rear direction outer end of the load transmission member. Further, the power unit, the floor cross-member, the load transmission member, and the bumper reinforcement are disposed at positions that overlap in a vehicle front-on view.

In the fourth aspect, the bumper reinforcement provided extending substantially along the vehicle width direction is provided at the vehicle front-rear direction outer end of the load transmission member. The power unit, the floor cross-member, the load transmission member, and the bumper reinforcement are respectively disposed at positions that overlap in a vehicle front view. Collision load toward the vehicle front-rear direction inner side input to the bumper reinforcement in a vehicle collision is thus able to be efficiently transmitted to the suspension member through the load transmission member, the floor cross-member, the first engagement portion, and the power unit.

A vehicle body structure according to a fifth aspect, in the third aspect, wherein the first engagement portion is provided at one of the floor cross-member or the power unit, and is configured projecting substantially along the vehicle front-rear direction toward the other of the floor cross-member or the power unit. Further, a recess is formed in the other of the floor cross-member or the power unit at a location facing the first engagement portion such that the first engagement portion is insertable into the recess.

In the fifth aspect, the first engagement portion is provided at one of the floor cross-member or the power unit, and is configured projecting substantially along the vehicle front-rear direction toward the other of the floor cross-member or the power unit. A recess is formed in the other of the floor cross-member or the power unit at a location facing the first engagement portion such that the first engagement portion is insertable into the recess. The floor cross-member and the power unit are therefore reliably engaged in cases in which collision load is input toward the vehicle front-rear direction inner side in a vehicle collision since the first engagement portion is inserted into the opposing recess. Namely, collision load from the floor cross-member is able to be efficiently transmitted to the power unit without deviation.

A vehicle body structure according to a sixth aspect, in the third aspect, wherein the second engagement portion is provided at one of the suspension member or the power unit, and is configured projecting substantially along the vehicle front-rear direction toward the other of the suspension member or the power unit. Further, a recess is formed in the other of the suspension member or the power unit at a location facing the second engagement portion such that the second engagement portion is insertable into the recess.

In the sixth aspect, the second engagement portion, in provided to one of the suspension member or the power unit, and is configured projecting substantially along the vehicle front-rear direction toward the other of the suspension member or the power unit. A recess is formed in the other of the suspension member or the power unit at a location facing the second engagement portion such that the second engagement portion is insertable into the recess. The suspension member and the power unit are therefore reliably engaged in cases in which collision load is input toward the vehicle front-rear direction inner side in a vehicle collision since the second engagement portion is inserted into the opposing recess. Namely, collision load from the power unit is able to be efficiently transmitted to the suspension member without deviation.

A vehicle body structure according to a seventh aspect, in the first aspect, wherein the first engagement portion is configured to be displaced in substantially the vehicle front-rear direction so as to engage with the power unit when input with collision load from the load transmission member substantially toward the vehicle front-rear direction inner side.

In the seventh aspect, the first engagement portion is configured to be displaced in substantially the vehicle front-rear direction so as to engage with the power unit when input with collision load toward the vehicle front-rear direction inner side from the load transmission member. The first engagement portion is therefore able to reliably engage with the power unit in cases in which collision load is input toward the vehicle front-rear direction inner side in a vehicle collision. This enables collision load to be efficiently transmitted to the power unit without deviation.

A vehicle body structure according to an eighth aspect, in the first aspect, wherein the second engagement portion is configured to be displaced in substantially the vehicle front-rear direction so as to engage with the suspension member when input with collision load from the power unit substantially toward the vehicle front-rear direction inner side.

In the eighth aspect, the second engagement portion is configured to be displaced in substantially the vehicle front-rear direction so as to engage with the suspension member when input with collision load from the load transmission member toward the vehicle front-rear direction inner side. The second engagement portion is therefore able to reliably engage with the suspension member in cases in which collision load is input toward the vehicle front-rear direction inner side in a vehicle collision. This enables collision load to be efficiently transmitted to the suspension member without deviation.

A vehicle body structure according to a ninth aspect, in the first aspect, wherein the suspension member includes a left and right pair of side rails, a front cross-member, and a rear cross-member. The left and right pair of side rails extend along the vehicle front-rear direction. The front cross-member couples the side rails together and supports a vehicle front-rear direction inner side of the power unit. The rear cross-member couples the side rails together and supports a vehicle front-rear direction outer side of the power unit. Further, the load transmission member is provided extending outward in the vehicle front-rear direction from the rear cross-member, and the first engagement portion is provided at a position at which the rear cross-member and the power unit face each other.

In the ninth aspect, in cases in which collision load is input toward the vehicle front-rear direction inner side in a vehicle collision, collision load is able to be transmitted from the rear cross-member to the side rails when the collision load is transmitted to the floor cross-member from the load transmission member through the rear cross-member, the first engagement portion, and the power unit. Namely, providing an additional load path enables collision load to be more efficiently transmitted to the vehicle body.

The vehicle body structure according to the first aspect exhibits the excellent advantageous effect of enabling damage to a battery unit to be suppressed in a vehicle collision while also suppressing an increase in vehicle weight.

The vehicle body structure according to the second aspect exhibits the excellent advantageous effect of enabling normal noise/vibration (NV) performance to be improved.

The vehicle body structure according to the third, fourth, and seventh to ninth aspects exhibits the excellent advantageous effect of enabling damage to a battery unit to be suppressed in a vehicle collision while even further suppressing an increase in vehicle weight.

The vehicle body structure according to the fifth and sixth aspects exhibits the excellent advantageous effect of more definitely enabling damage to the battery unit to be suppressed in a vehicle collision while suppressing an increase in vehicle weight.

BRIEF DESCRIPTION OF THE DRAWINGS

Exemplary embodiments will be described in detail based on the following figures, wherein.

DETAILED DESCRIPTION

The arrow FR, the arrow OUT, and the arrow UP illustrated in FIG. 1 to FIG. 7 respectively indicate the front side in a vehicle front-rear direction, a vehicle width direction outer side, and the upper side in a vehicle vertical direction.

First Exemplary Embodiment

Explanation follows regarding a first exemplary embodiment of a vehicle body structure according to the present disclosure, with reference to FIG. 1 to FIG. 4.

Figure 1:
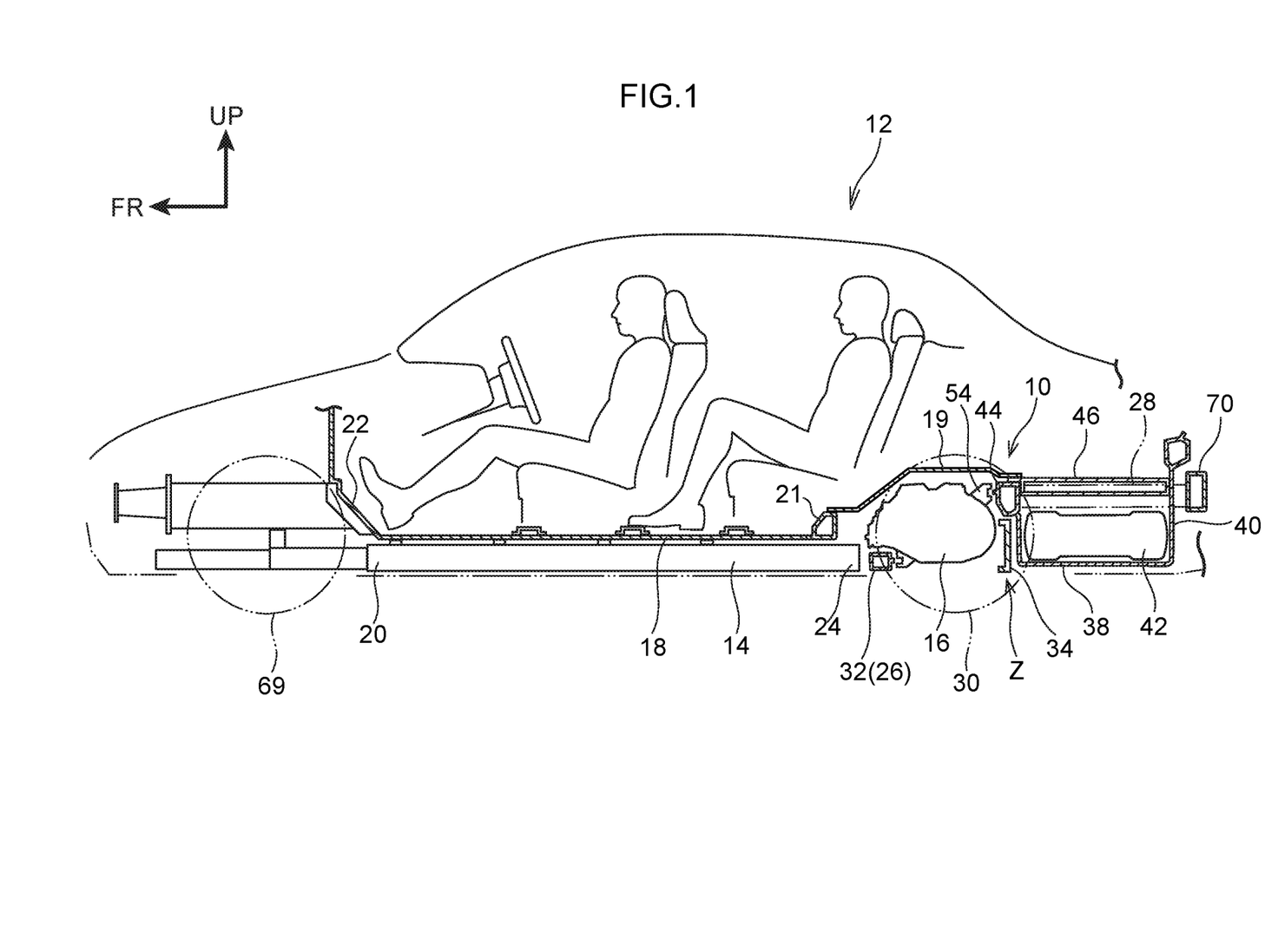
FIG. 1 is a schematic cross-section illustrating a vehicle body structure according to a first exemplary embodiment.

As illustrated in FIG. 1, a vehicle 12 to which a vehicle body structure 10 has been applied is an electric vehicle driven by an electric motor (motor unit 16), serving as a power unit, that is driven when supplied with power from a battery unit 14, described later. The vehicle 12 includes a floor panel 18. A left and right pair of rockers 11 (see FIG. 4, also called "side sills") are disposed on the vehicle width direction outer sides of the floor panel 18 with their length directions running along the vehicle front-rear direction. Upper portions of the rockers 11 are joined to a terminal end of the floor panel 18 using spot welding.

The battery unit 14 is provided beneath the vehicle flooring, namely at the vehicle lower side of the floor panel 18 and between the left and right pair of rockers 11. The battery unit 14 is disposed at a position overlapping with the motor unit 16 in a vehicle front-on view. The battery unit 14 is formed in substantially a rectangular box shape, with a front end 20 of the battery unit 14 disposed at a position corresponding to a dash panel 22, and a rear end 24 of the battery unit 14 disposed spaced apart from the motor unit 16 in the vehicle front-rear direction. The battery unit 14 is, for example, attached to the floor panel 18.

Figure 4:
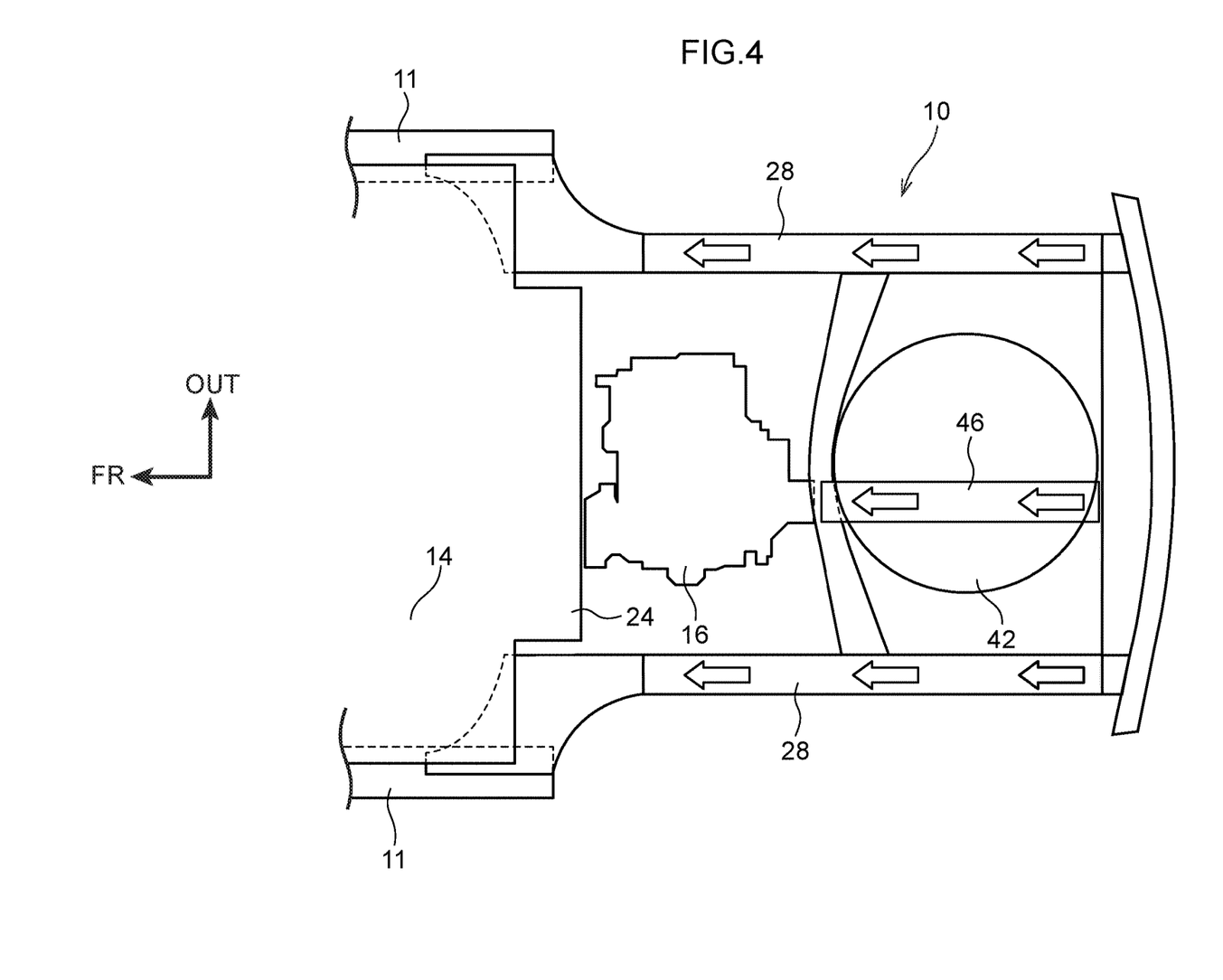
FIG. 4 is a plan view illustrating a vehicle body structure according to the first exemplary embodiment.

Rear ends of the left and right pair of rockers 11 are each connected to a rear side member 28 (see FIG. 4). A rear floor panel 19 that configures flooring at the vehicle rear is provided between the left and right pair of rear side members 28. Vehicle width direction ends of the rear floor panel 19 are connected to a vehicle width direction inner side face of the respective rear side member 28.

A vehicle front-side end of the rear floor panel 19 is connected to an upper face of a center floor cross-member 21 that extends in the vehicle width direction. The center floor cross-member 21 is formed with a substantially angular column shape, and a vehicle front-side end of the center floor cross-member 21 is connected to a rear end of the floor panel 18.

Figure 3:
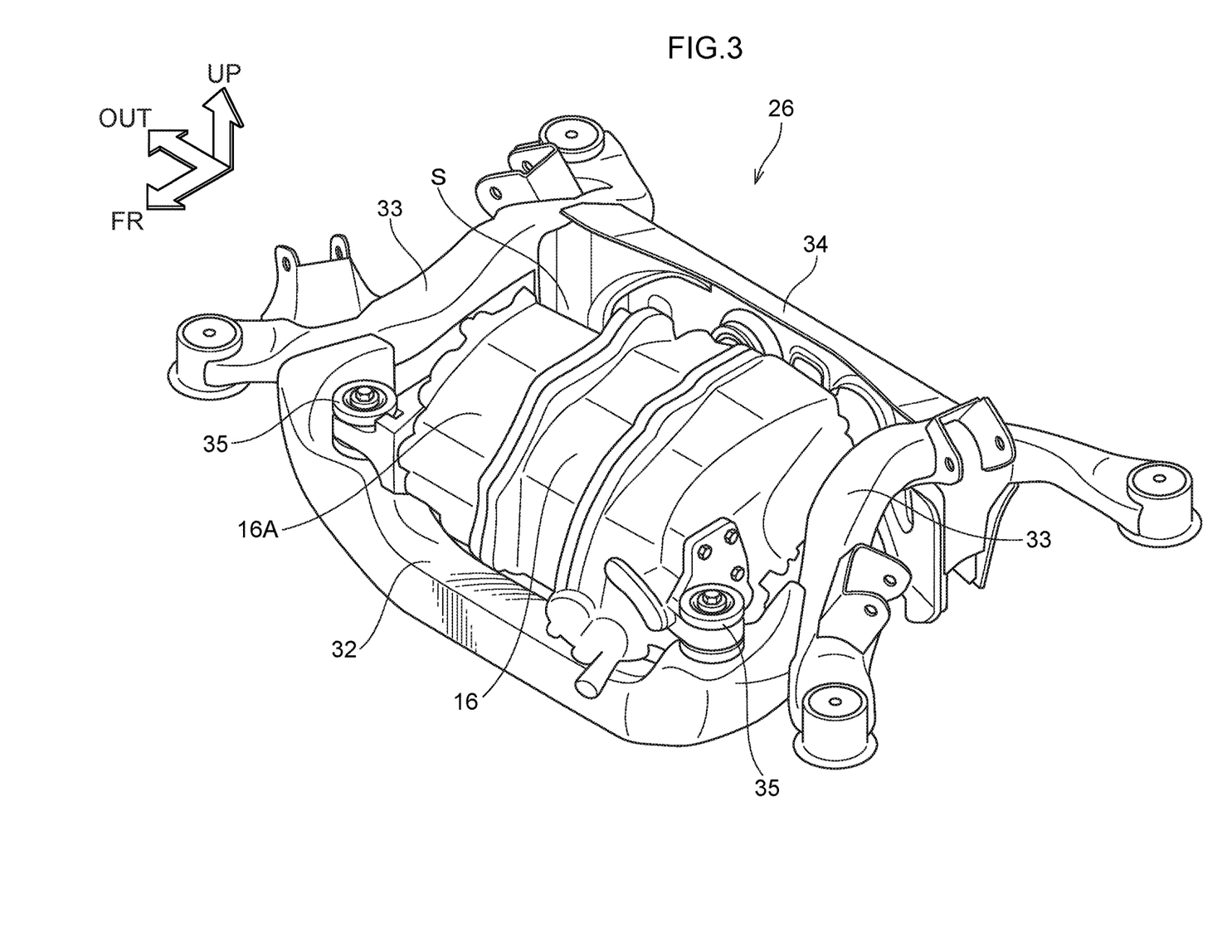
FIG. 3 is a perspective view illustrating a power unit of a vehicle body structure according to the first exemplary embodiment.

A rear suspension member 26, serving as a suspension member, is disposed at the vehicle lower side of the left and right pair of rear side members 28 and between a left and right pair of rear tires 30. As illustrated in FIG. 3, the rear suspension member 26 is formed in substantially a rectangular shape by a front cross-member 32 extending along the vehicle width direction, a left and right pair of side rails 33 that extend toward the vehicle rear from respective vehicle width direction ends of the front cross-member 32, and a rear cross-member 34 that couples together rear ends of the left and right pair of side rails 33. As viewed from the vehicle upper side, a space S is formed in the middle of the rear suspension member 26. The rear suspension member 26 is fastened and attached to the rear side members 28 in a state hanging under the rear side members 28 using non-illustrated bolts inserted into the rear suspension member 26 from the vehicle lower side. The rear suspension member 26 is also, for example, attached to a suspension, a suspension arm, and a stabilizer (none of which are illustrated in the drawings) that span between the left and right rear tires 30.

The motor unit 16 is disposed in the space S of the rear suspension member 26. The motor unit 16 is positioned between the left and right pair of side rails 33 of the rear suspension member 26. A vehicle front-side end (vehicle front-rear direction inner end) 16A of the motor unit 16 is attached to an upper face of the front cross-member 32 of the rear suspension member 26 from the vehicle upper side of the rear suspension member 26 via a left and right pair of support mounts 35. The support mounts 35 are configured by elastic members and are substantially cylindrically shaped with their axial directions running along substantially the vehicle vertical direction.

The motor unit 16 is attached to a side face of the rear cross-member 34 from the vehicle front side via a bracket and a support mount configured by an elastic member (neither of which is illustrated in the drawings). The motor unit 16 is capable of rotating the left and right pair of rear tires 30 (see FIG. 1) through a non-illustrated output shaft.

Figure 2:
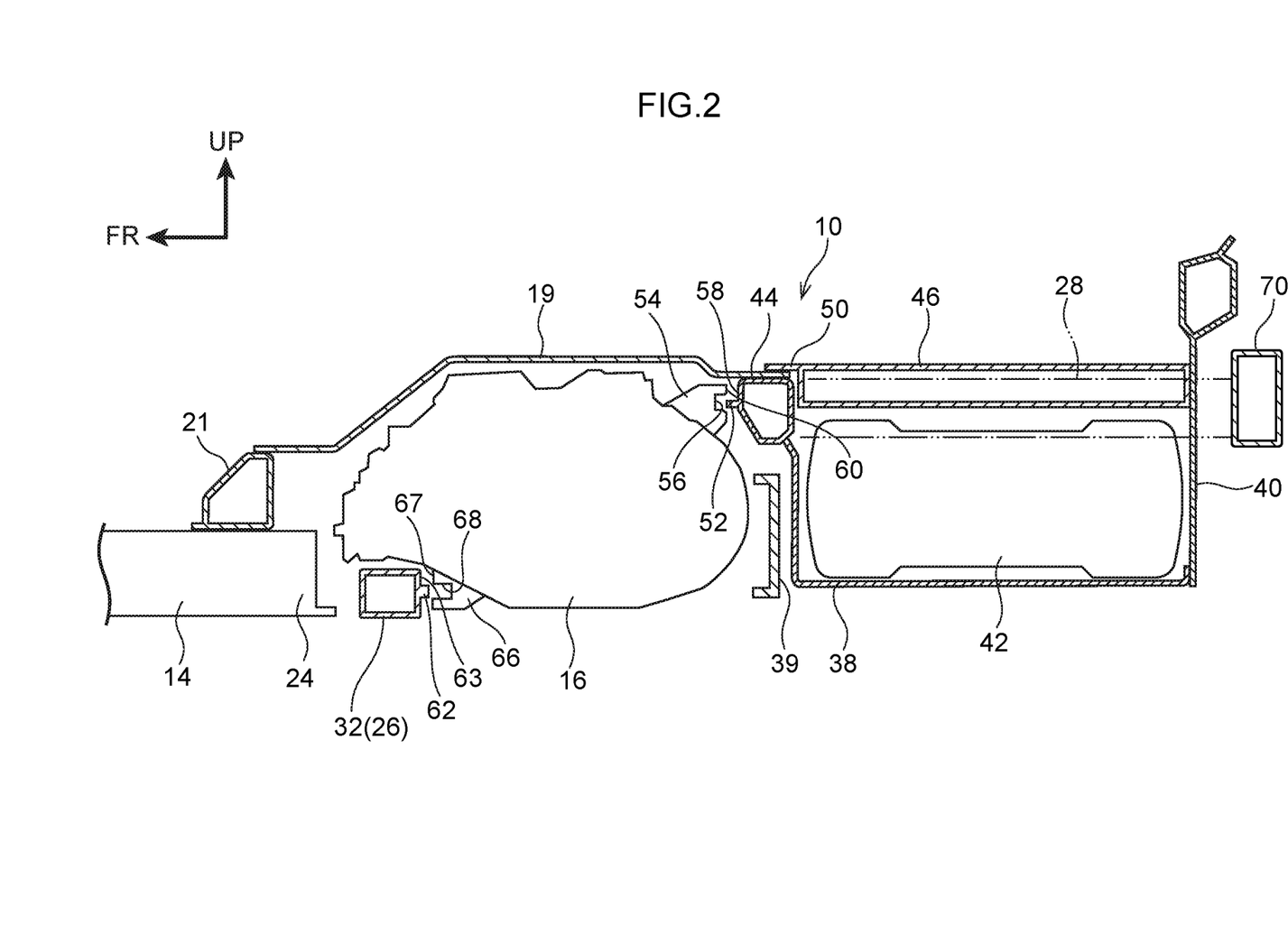
FIG. 2 is an enlarged cross-section of section Z in in FIG. 1.

As illustrated in FIG. 2, a rear floor pan 38 is provided at the vehicle rear side of the rear suspension member 26. A vehicle rear end of the rear floor pan 38 is connected to a tail gate panel 40 provided at the vehicle rear side of the rear floor pan 38. The rear floor pan 38 is formed in a shape recessed toward the vehicle lower side. A spare tire 42 is stored in the rear floor pan 38. A vehicle front-side end of the rear floor pan 38 is connected to the vehicle lower side of a rear floor cross-member 44, serving as a floor cross-member. The rear floor cross-member 44 is formed with a substantially angular column shape extending in substantially the vehicle width direction and couples together the left and right pair of rear side members 28 (see FIG. 4).

A load transmission member 46 that extends along substantially the vehicle front-rear direction is provided between the tail gate panel 40 and the rear floor cross-member 44 (also see FIG. 4). The load transmission member 46 is, for example, formed with a substantially angular column shape. The load transmission member 46 configures part of a substantially plate shaped cover member 50 that covers the inside of the rear floor pan 38 from the vehicle upper side. In other words, the load transmission member 46 is provided extending outward from the rear floor cross-member 44 in substantially the vehicle front-rear direction.

A first engagement portion 52 is provided between the rear floor cross-member 44 and the motor unit 16. Specifically, the first engagement portion 52 is formed projecting toward the vehicle front at a vehicle front-side face of the rear floor cross-member 44. A first engaged bracket 54 is attached to the motor unit 16 at a location corresponding to the first engagement portion 52. A recess 56 open toward the vehicle rear is formed in a vehicle rear portion of the first engaged bracket 54. The recess 56 is normally spaced apart from the first engagement portion 52 in the vehicle front-rear direction. Note that although not illustrated in the drawings, in a vehicle collision, when input with collision load toward the vehicle front-rear direction inner side, the first engagement portion 52 is inserted into the recess 56 such that the first engagement portion 52 engages with the recess 56, and by extension also engages with the first engaged bracket 54.

A flat portion 60, capable of making contact with a flat face 58 near the first engagement portion 52 on the vehicle front-side face of the rear floor cross-member 44, is formed at both the vehicle upper side and the vehicle lower side of the recess 56 in the first engaged bracket 54.

A second engagement portion 62 is provided on the rear suspension member 26 between the front cross-member 32 and the motor unit 16. Specifically, the second engagement portion 62 is formed projecting toward the vehicle rear at a vehicle rear-side face of the front cross-member 32 of the rear suspension member 26. A second engaged bracket 66 is also attached to the motor unit 16 at a location corresponding to the second engagement portion 62. A recess 68 open toward the vehicle front is formed in a vehicle front portion of the second engaged bracket 66. The recess 68 is normally spaced apart from the second engagement portion 62 in the vehicle front-rear direction. Note that although not illustrated in the drawings, in a vehicle collision, when input with collision load toward the vehicle front-rear direction inner side, the second engagement portion 62 is inserted into the recess 68 such that the second engagement portion 62 engages with the recess 68, and by extension also engages with the second engaged bracket 66.

A flat portion 67, capable of making contact with a flat face 63 near the second engagement portion 62 on the vehicle rear-side face of the front cross-member 32, is formed at both the vehicle upper side and the vehicle lower side of the recess 68 in the second engaged bracket 66.

A vehicle rear end of each rear side member 28 is connected to a substantially angular column shaped bumper reinforcement 70 provided extending along substantially the vehicle width direction. Note that although not illustrated in the drawings, the bumper reinforcement 70, the rear floor cross-member 44, the load transmission member 46, and the motor unit 16 are disposed so as to overlap in a vehicle front-on view.

As illustrated in FIG. 2, in the present exemplary embodiment, the motor unit 16 is attached to the rear suspension member 26 attached to the left and right pair of rear side members 28 provided extending in the vehicle front-rear direction. The battery unit 14 is disposed at a position overlapping with the motor unit 16 in a vehicle front-on view, and is provided spaced apart from the motor unit 16 at the vehicle front-rear direction inner side of the motor unit 16. The load transmission member 46 is positioned overlapping with the motor unit 16 in a vehicle front-on view, and is provided spaced apart from the motor unit 16 at the vehicle front-rear direction outer side of the motor unit 16. The first engagement portion 52 is provided between the load transmission member 46 and the motor unit 16. The first engagement portion 52 transmits collision load to the motor unit 16 when input with collision load toward substantially the vehicle front-rear direction inner side from the load transmission member 46. The second engagement portion 62 is provided between the rear suspension member 26 and the motor unit 16. The second engagement portion 62 transmits collision load to the rear suspension member 26 when input with collision load toward substantially the vehicle front-rear direction inner side from the motor unit 16. Accordingly, although the motor unit 16 is displaced toward the battery unit 14 due to receiving collision load from the load transmission member 46 through the first engagement portion 52 when collision load is input toward the vehicle front-rear direction inner side in a vehicle collision, since collision load is transmitted from the motor unit 16 to the rear suspension member 26 by the second engagement portion 62, it is possible to suppress displacement of the motor unit 16 toward the battery unit 14. Since interference between the motor unit 16 and the battery unit 14 in a vehicle collision can be suppressed, it is thus possible to suppress damage to the battery unit 14.

The motor unit 16 is generally a rigid body, which enables collision load toward the vehicle front-rear direction inner side to be transmitted from the load transmission member 46 through the motor unit 16 to the rear suspension member 26 attached to the rear side members 28 in a vehicle collision. Namely, in addition to through the left and right pair of rear side members 28, which are part of the vehicle frame, it possible to use the motor unit 16 to provide another load path through which load can be transmitted (see the arrows in FIG. 4), thus enabling collision load to be efficiently transmitted to the vehicle body. This obviates the need to raise the rigidity of the rear side members 28, in contrast to cases in which load paths are only configured through the rear side members 28. This enables damage to the battery unit 14 to be suppressed in a vehicle collision while also suppressing an increase in vehicle weight.

The first engagement portion 52 and the second engagement portion 62 are normally disposed spaced apart from the motor unit 16. Thus, vibration and the like resulting from normal operation of the motor unit 16 can be suppressed from being transmitted to the load transmission member 46, the rear suspension member 26, and the like, through the first engagement portion 52 and the second engagement portion 62. This enables normal noise/vibration (NV) performance to be improved.

The load transmission member 46 is provided extending outward in substantially the vehicle front-rear direction from the rear floor cross-member 44, which couples the left and right pair of rear side members 28 together in substantially the vehicle width direction and faces the motor unit 16, and the first engagement portion 52 is provided at a position where the rear floor cross-member 44 and the motor unit 16 face each other. Thus, in cases in which collision load is input toward the vehicle front-rear direction inner side in a vehicle collision, collision load is able to be transmitted from the rear floor cross-member 44 to the rear side members 28 when the collision load is transmitted to the rear suspension member 26 from the load transmission member 46 through the rear floor cross-member 44, the first engagement portion 52, and the motor unit 16. Namely, providing an additional load path enables collision load to be better transmitted to the vehicle body.

The bumper reinforcement 70 provided extending along substantially the vehicle width direction is provided at the vehicle front-rear direction outer end of the load transmission member 46. The motor unit 16, the rear floor cross-member 44, the load transmission member 46, and the bumper reinforcement 70 are respectively disposed at positions that overlap in a vehicle front-on view. Collision load toward the vehicle front-rear direction inner side input to the bumper reinforcement 70 in a vehicle collision is thus able to be efficiently transmitted to the rear suspension member 26 through the load transmission member 46, the rear floor cross-member 44, the first engagement portion 52, and the motor unit 16. This enables damage to the battery unit 14 to be suppressed in a vehicle collision while even further suppressing an increase in vehicle weight.

When input with collision load toward the vehicle front-rear direction inner side from the load transmission member 46, the first engagement portion 52 is displaced in substantially the vehicle front-rear direction so as to engage with the motor unit 16. Specifically, the first engagement portion 52 is provided to the rear floor cross-member 44, and is configured projecting toward the motor unit 16 in substantially the vehicle front-rear direction. The recess 56 is provided to the motor unit 16 at another location facing the first engagement portion 52 such that the first engagement portion 52 is able to be inserted therein. The rear floor cross-member 44 and the motor unit 16 are therefore reliably engaged in cases in which collision load is input toward the vehicle front-rear direction inner side in a vehicle collision since the first engagement portion 52 is inserted into the opposing recess 56. Namely, collision load from the rear floor cross-member 44 is able to be efficiently transmitted to the motor unit 16 without deviation.

When input with collision load toward the vehicle front-rear direction inner side from the load transmission member 46, the second engagement portion 62 is displaced in substantially the vehicle front-rear direction so as to engage with the rear suspension member 26. Specifically, the second engagement portion 62 is provided to the front cross-member 32 of the rear suspension member 26, and is configured projecting toward the motor unit 16 in substantially the vehicle front-rear direction. The recess 68 is provided to the motor unit 16 at a location facing the second engagement portion 62 such that the second engagement portion 62 is able to be inserted therein. The front cross-member 32 of the rear suspension member 26 and the motor unit 16 are therefore reliably engaged in cases in which collision load is input toward the vehicle front-rear direction inner side in a vehicle collision since the second engagement portion 62 is inserted into the opposing recess 68. Namely, collision load from the motor unit 16 is able to be efficiently transmitted to the front cross-member 32 of the rear suspension member 26 without deviation. This more definitely enables damage to the battery unit 14 to be suppressed in a vehicle collision while suppressing an increase in vehicle weight.

Note that in the first exemplary embodiment described above, although the first engagement portion 52 is provided to the rear floor cross-member 44, there is no limitation thereto, and configuration may be such that the first engagement portion 52 is provided to the motor unit 16. In this case, the recess 56 is to be provided to the rear floor cross-member 44 facing the first engagement portion 52. Similarly, although the second engagement portion 62 is provided to the front cross-member 32 of the rear suspension member 26, there is no limitation thereto, and the second engagement portion 62 may be provided to the motor unit 16. In this case, the recess 68 is to be provided to the front cross-member 32 facing the second engagement portion 62.

Further, although the first engagement portion 52 is provided to the rear floor cross-member 44, there is no limitation thereto, and the first engagement portion 52 may be provided to another member, such as the load transmission member 46.

Second Exemplary Embodiment

Figure 5:
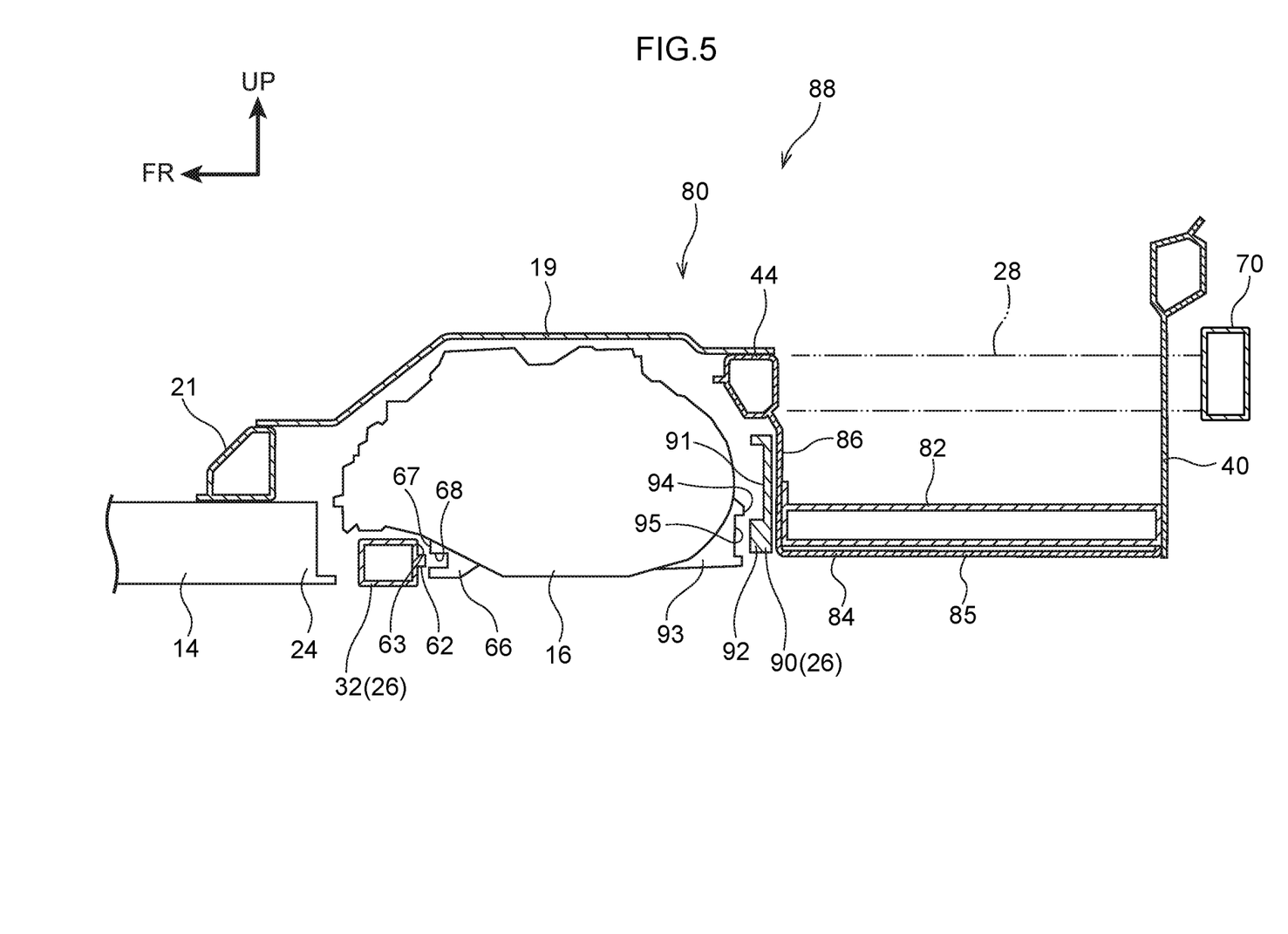
FIG. 5 is an enlarged cross-section corresponding to FIG. 2, illustrating a vehicle body structure according to a second exemplary embodiment.

Explanation follows regarding a vehicle body structure 80 according to a second exemplary embodiment of the present disclosure, with reference to FIG. 5. Note that portions that are configured essentially the same as in the first exemplary embodiment described above are appended with the same reference signs, and explanation thereof will not be given.

As illustrated in FIG. 5, the vehicle body structure 80 according to the second exemplary embodiment is configured essentially the same as that of the first exemplary embodiment, but features a load transmission member 82 disposed over a bottom wall 85 of a rear floor pan 84.

Namely, the load transmission member 82 is provided extending along substantially the vehicle front-rear direction over the bottom wall 85 of the rear floor pan 84. The load transmission member 82 is, for example, formed with a substantially angular column shape. A vehicle rear-side end of the load transmission member 82 is connected to the tail gate panel 40, and a vehicle front-side end of the load transmission member 82 is connected to an upright wall 86 of the rear floor pan 84 facing the tail gate panel 40. Note that in the second exemplary embodiment, a vehicle 88 is provided with a non-illustrated flat tire repair kit and is not provided with the spare tire 42 (see FIG. 1 and FIG. 2).

A first engagement portion 92 is provided between a rear cross-member 90 of the rear suspension member 26 and the motor unit 16. Specifically, the first engagement portion 92 is formed projecting toward the vehicle front at the vehicle lower side of a vehicle front-side face of the rear cross-member 90. A first engaged bracket 93 is attached to the motor unit 16 a location corresponding to the first engagement portion 92. A recess 95 open toward the vehicle rear is formed in a vehicle rear portion of the first engaged bracket 93. The recess 95 is normally spaced apart from the first engagement portion 92 in the vehicle front-rear direction. Note that although not illustrated in the drawings, in a vehicle collision, when input with collision load toward the vehicle front-rear direction inner side, the first engagement portion 92 is inserted into the recess 95 such that the first engagement portion 92 engages with the recess 95, and by extension also engages with the first engaged bracket 93.

A flat portion 94, capable of making contact with a flat face 91 near the first engagement portion 92 on the vehicle front-side face of the rear cross-member 90, is formed at the vehicle upper side of the recess 95 in the first engaged bracket 93. Note that although not illustrated in the drawings, the bumper reinforcement 70 and the rear floor cross-member 44, and the load transmission member 82, the rear cross-member 90, and the motor unit 16 are respectively disposed so as to overlap in a vehicle front-on view.

The configuration described above is similar to that for the vehicle body structure 10 of the first exemplary embodiment except for the load transmission member 82 being disposed over the bottom wall 85 of the rear floor pan 84, and so is able to obtain similar advantageous effects to the first exemplary embodiment. In addition, by disposing the load transmission member 82 over the bottom wall 85 of the rear floor pan 84 in a vehicle not provided with a spare tire 42 (see FIG. 1 and FIG. 2), the space at the vehicle upper side of the load transmission member 82 in the rear floor pan 84 is able to be used for storage or the like. Namely, vehicle space is able to be used more efficiently.

Third Exemplary Embodiment

Figure 6:
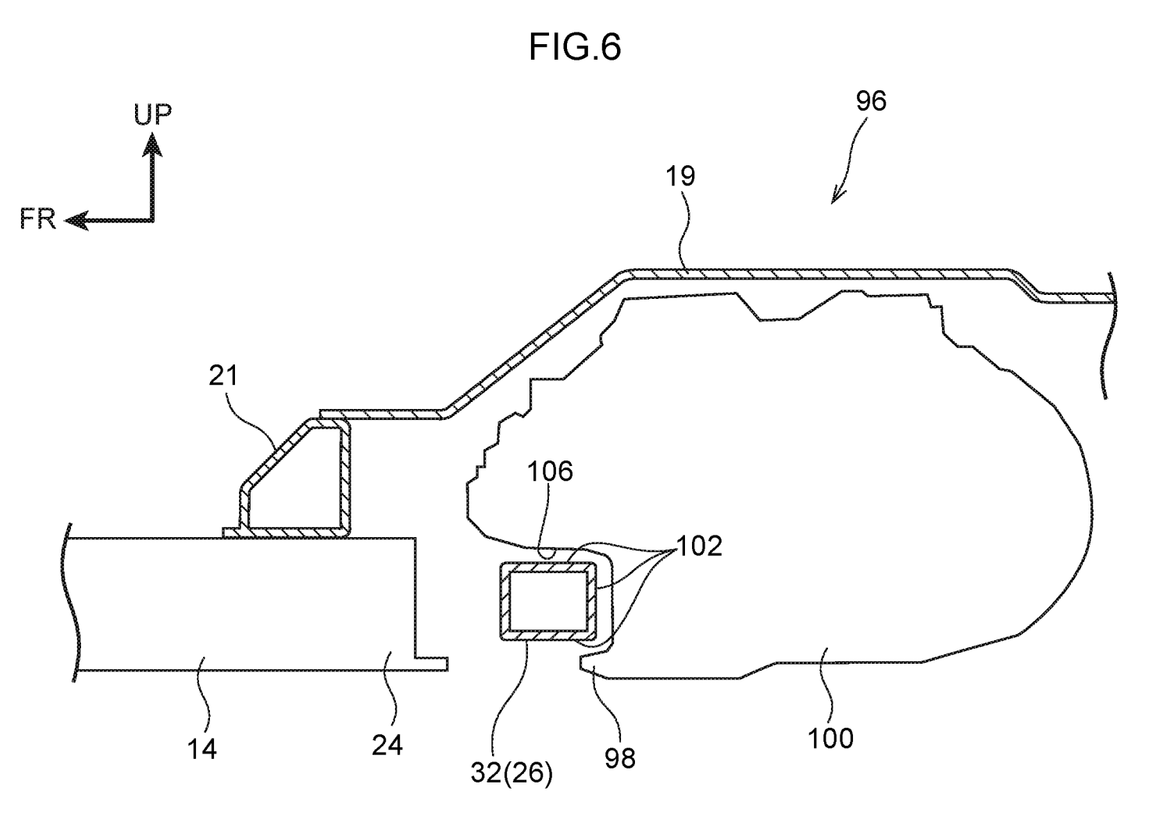
FIG. 6 is an enlarged cross-section corresponding to FIG. 2, illustrating a vehicle body structure according to a third exemplary embodiment.

Explanation follows regarding a vehicle body structure 96 according to a third exemplary embodiment of the present disclosure, with reference to FIG. 6. Note that portions that are configured essentially the same as in the first exemplary embodiment described above are appended with the same reference signs, and explanation thereof will not be given.

As illustrated in FIG. 6, the vehicle body structure 96 according to the third exemplary embodiment is configured essentially the same as that of the first exemplary embodiment, but features a second engaged portion 98 that is integrally formed to a motor unit 100.

Namely, a second engagement portion 102 is provided between the front cross-member 32 of the rear suspension member 26 and the motor unit 100. Specifically, the second engagement portion 102 is configured by a vehicle rear-side face, a vehicle upper-side face, and a vehicle lower-side face of the front cross-member 32 of the rear suspension member 26. The second engaged portion 98 is integrally formed to the motor unit 100 at a location corresponding to the second engagement portion 102. A recess 106 open toward the vehicle front is formed in the second engaged portion 98. The recess 106 is normally spaced apart from the second engagement portion 102 in the vehicle front-rear direction and in the vehicle vertical direction. Note that although not illustrated in the drawings, in a vehicle collision, when input with collision load toward the vehicle front-rear direction inner side, the second engagement portion 102 engages with the recess 106, and by extension also engages with the second engaged portion 98.

The configuration described above is similar to that for the vehicle body structure 10 of the first exemplary embodiment except for the second engaged portion 98 being integrally formed to the motor unit 100, and so is able to obtain similar advantageous effects to the first exemplary embodiment. In addition, since there is no need to form the front cross-member 32 with a projecting shape, the number of manufacturing processes can be reduced, enabling costs to be suppressed.

Fourth Exemplary Embodiment

Figure 7:
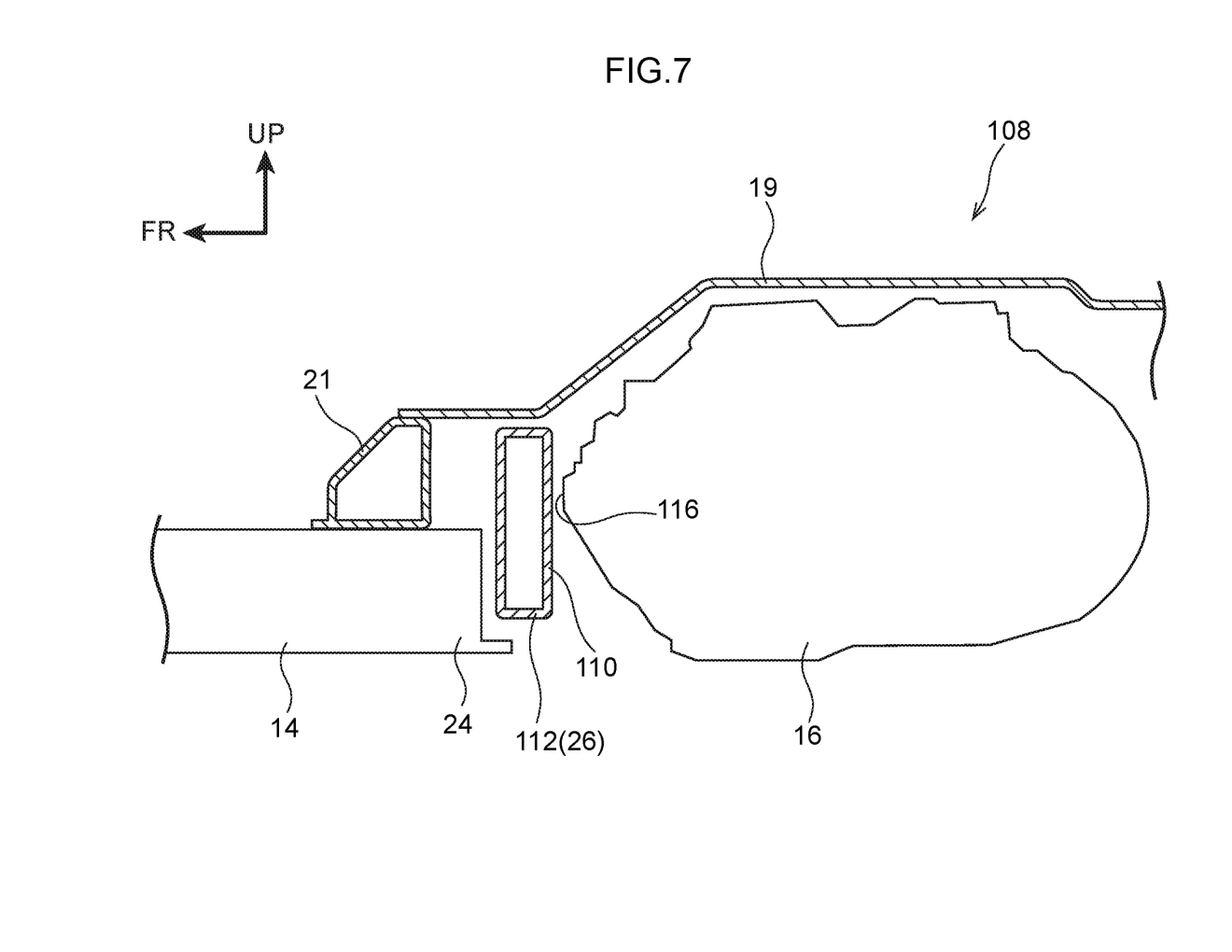
FIG. 7 is an enlarged cross-section corresponding to FIG. 2, illustrating a vehicle body structure according to a fourth exemplary embodiment.

Explanation follows regarding a vehicle body structure 108 according to a fourth exemplary embodiment of the present disclosure, with reference to FIG. 7. Note that portions that are configured essentially the same as in the first exemplary embodiment described above are appended with the same reference signs, and explanation thereof will not be given.

As illustrated in FIG. 7, the vehicle body structure 108 according to the fourth exemplary embodiment is configured essentially the same as that of the first exemplary embodiment, but features a front cross-member 112, serving as a second engagement portion 110, disposed at the substantial vehicle vertical direction center of the motor unit 16.

Namely, the second engagement portion 110 is provided between the front cross-member 112 of the rear suspension member 26 and the motor unit 16. Specifically, the second engagement portion 110 is configured including a vehicle rear-side face of the front cross-member 112 of the rear suspension member 26. The front cross-member 112 is disposed at the substantial vehicle vertical direction center of the motor unit 16. A vehicle upper-side face of the front cross-member 112 is disposed near the rear floor panel 19, and a vehicle lower-side face of the front cross-member 112 is disposed near the substantial vehicle vertical direction center of the battery unit 14. Namely, the front cross-member 112 is formed in a substantially rectangular shape with its length direction in the vehicle vertical direction in a vehicle side view.

A flat face 116 is formed to the motor unit 16 at a location corresponding to the second engagement portion 110. The flat face 116 of the motor unit 16 is normally spaced apart from the second engagement portion 110 in the vehicle front-rear direction. Note that although not illustrated in the drawings, in a vehicle collision, when input with collision load toward the vehicle front-rear direction inner side, the flat face 116 of the motor unit 16 makes contact with the second engagement portion 110.

The configuration described above is similar to that for the vehicle body structure 10 of the first exemplary embodiment except for the front cross-member 112 serving as the second engagement portion 110 being disposed at the substantial vehicle vertical direction center of the motor unit 16, and so is able to obtain similar advantageous effects to the first exemplary embodiment. In addition, since there is no need to form the front cross-member 112 and the motor unit 16 with a projection or the like, the number of manufacturing processes can be reduced, enabling costs to be suppressed.

Note that as illustrated in FIG. 1, in the first exemplary embodiment to the fourth exemplary embodiment described above, although the motor unit 16 is provided in a vehicle rear section of the vehicle 12, namely between the left and right pair of rear tires 30, there is no limitation thereto, and configuration may be such that a motor unit is provided in a vehicle front section (for example, between a left and right pair of front tires 69), a load transmission member is provided spaced apart from the motor unit at the front side of the motor unit in the vehicle front-rear direction, a first engagement portion is provided between the load transmission member and the motor unit, and a second engagement portion is provided between the motor unit and a non-illustrated front suspension member.

Further, as illustrated in FIG. 2, although the first engagement portion 52 is configured as a projection integrally formed to the rear floor cross-member 44, there is no limitation thereto, and configuration may be such that another member such as a bolt is attached to the rear floor cross-member 44 such that this bolt engages with the first engaged bracket 54. Similarly, although the second engagement portion 62 is configured as a projection integrally formed to the front cross-member 32, there is no limitation thereto, and configuration may be such that another member such as a bolt is attached to the front cross-member 32 such that this bolt engages with the second engaged bracket 66.

Although explanation has been given regarding exemplary embodiments of the present disclosure, the present disclosure is not limited to the above, and obviously various other modifications may be implemented within a range not departing from the spirit of the present disclosure.

What is claimed is:

1. A vehicle body structure, comprising:
   a suspension member that is attached to a left and right pair of side members that are provided extending along a vehicle front-rear direction;
   a power unit that is attached to the suspension member;
   a battery unit that is disposed at a position overlapping with the power unit in a vehicle front view, and that is provided spaced apart from the power unit at an inner side in the vehicle front-rear direction with respect to the power unit;
   a load transmission member that is disposed at a position overlapping with the power unit in a vehicle front view, and that is provided spaced apart from the power unit at an outer side in the vehicle front-rear direction with respect to the power unit;
   a first engagement portion that is provided between the load transmission member and the power unit, and that is configured to transmit collision load to the power unit when input with collision load from the load transmission member substantially toward the vehicle front-rear direction inner side; and
   a second engagement portion that is provided between the suspension member and the power unit, and that is configured to transmit collision load to the suspension member when input with collision load from the power unit substantially toward the vehicle front-rear direction inner side.

2. The vehicle body structure of claim 1, wherein the first engagement portion and the second engagement portion are normally disposed spaced apart from the power unit.

3. The vehicle body structure of claim 1, wherein:
   the load transmission member is provided extending outward substantially in the vehicle front-rear direction from a floor cross-member, the floor cross-member coupling the left and right pair of side members together substantially in a vehicle width direction and facing the power unit; and
   the first engagement portion is provided at a position at which the floor cross-member and the power unit face each other.

4. The vehicle body structure of claim 3, wherein:
   a bumper reinforcement that extends substantially along the vehicle width direction is provided at a vehicle front-rear direction outer end of the load transmission member; and
   the power unit, the floor cross-member, the load transmission member, and the bumper reinforcement are disposed at positions that overlap in a vehicle front view.

5. The vehicle body structure of claim 3, wherein:
   the first engagement portion is provided at one of the floor cross-member or the power unit, and is configured projecting substantially along the vehicle front-rear direction toward the other of the floor cross-member or the power unit; and
   a recess is formed in the other of the floor cross-member or the power unit at a location facing the first engagement portion such that the first engagement portion is insertable into the recess.

6. The vehicle body structure of claim 3, wherein:
   the second engagement portion is provided at one of the suspension member or the power unit, and is configured projecting substantially along the vehicle front-rear direction toward the other of the suspension member or the power unit; and
   a recess is formed in the other of the suspension member or the power unit at a location facing the second engagement portion such that the second engagement portion is insertable into the recess.

7. The vehicle body structure of claim 1, wherein the first engagement portion is configured to be displaced in substantially the vehicle front-rear direction so as to engage with the power unit when input with collision load from the load transmission member substantially toward the vehicle front-rear direction inner side.

8. The vehicle body structure of claim 1, wherein the second engagement portion is configured to be displaced in substantially the vehicle front-rear direction so as to engage with the suspension member when input with collision load from the power unit substantially toward the vehicle front-rear direction inner side.

9. The vehicle body structure of claim 1, wherein:
   the suspension member includes a left and right pair of side rails extending along the vehicle front-rear direction, a front cross-member that couples the side rails together and that supports a vehicle front-rear direction inner side of the power unit, and a rear cross-member that couples the side rails together and that supports a vehicle front-rear direction outer side of the power unit;
   the load transmission member is provided extending outward in the vehicle front-rear direction from the rear cross-member; and
   the first engagement portion is provided at a position at which the rear cross-member and the power unit face each other.

* * * * *

UNITED STATES PATENT AND TRADEMARK OFFICE
CERTIFICATE OF CORRECTION

PATENT NO. : 10,507,869 B2
APPLICATION NO. : 16/028809
DATED : December 17, 2019
INVENTOR(S) : Shin Inoue It is certified that error appears in the above-identified patent and that said Letters Patent is hereby corrected as shown below:

On the Title Page

Column 1, Item (73), Assignee:
Change "TOYOTA JIDOSHA KABUSHIKI KAISHA, Tokyo (JP)"
To -- TOYOTA JIDOSHA KABUSHIKI KAISHA, Toyota (JP) --.

Signed and Sealed this
Third Day of March, 2020

Andrei Iancu
*Director of the United States Patent and Trademark Office*